United States Patent [19]
Dorman

[11] 3,821,189
[45] June 28, 1974

[54] N ALPHA-(SUBSTITUTED CARBOBENZYLOXYAMINO)-HEXANOYL)-NE-(CARBOBENZYLOXY)-L- LYSINE COMPOUNDS

[75] Inventor: Linneaus C. Dorman, Midland, Mich.

[73] Assignee: The Dow Chemical Company, Midland, Mich.

[22] Filed: Sept. 25, 1972

[21] Appl. No.: 291,813

[52] U.S. Cl. .............................. 260/112.5, 424/177
[51] Int. Cl. ..................... C07c 103/52, C08h 1/00
[58] Field of Search .................................. 260/112.5

[56] References Cited
UNITED STATES PATENTS
3,433,779   3/1969   Vogler ............................ 260/112.5
3,474,083   10/1969   Shiga et al. ...................... 260/112.5

OTHER PUBLICATIONS
Zahn et al., Ann. Chem., 636, 117 (1960).

Primary Examiner—Lewis Gotts
Assistant Examiner—Reginald J. Suyat
Attorney, Agent, or Firm—Gary D. Street

[57] ABSTRACT
Dipeptides of 6-(substituted carbobenzyloxyamino)-hexanoic acids and N$^\epsilon$-(carbobenzyloxy)-L-lysine, useful as bronchial dilators.

9 Claims, No Drawings

N ALPHA-(SUBSTITUTED CARBOBENZYLOXYAMINO)-HEXANOYL)-NE-(CARBOBENZYLOXY)-L- LYSINE COMPOUNDS

SUMMARY OF THE INVENTION

The present invention is directed to novel chemical compositions of matter, more particularly, the dipeptides of 6-(substituted carbobenzyloxyamino)hexanoic acids and N$^\epsilon$-(carbobenzyloxy)-L-lysine corresponding to the formula

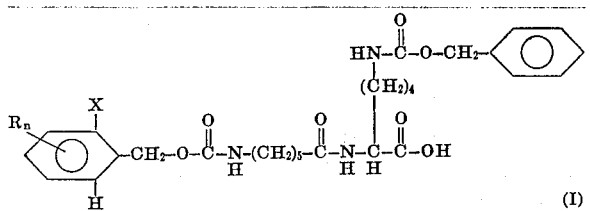

(I)

Throughout this specification, X represents hydrogen or chloro, R represents halo or methoxy and $n$ represents one of the integers 0 or 1, with the proviso that when n is zero, X is chloro and that when $n$ is 1, X is hydrogen. As used herein, the term "halo" means fluoro, chloro or bromo.

The N-protected dipeptide compounds of the present invention are usually white crystalline solids at room temperature. In general, they are prepared by the procedure summarized in FIG. 1 by a carbodiimide coupling of an appropriate 6-(substituted carbobenzyloxyamino)hexanoic acid (II) and an N$^\epsilon$-(carbobenzyloxy)-L-lysine lower alkyl ester monohydrochloride (III). As used herein, the term "lower alkyl" (represented by R' in FIG. 1) represents a saturated alkyl radical of from one to four carbon atoms. The resulting dipeptide lower alkyl esters (IV) thus obtained are saponified to obtain the dipeptide acids (I) comprising this invention, which are useful as bronchial dilators.

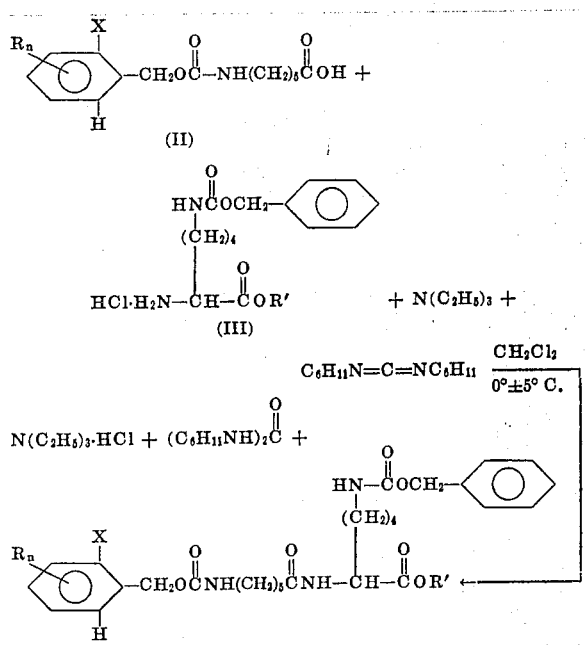

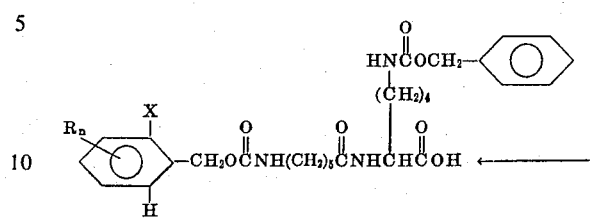

Figure 1

DESCRIPTION OF SOME PREFERRED EMBODIMENTS

A. Preparation of the Dipeptide Acids from the 6-(Substituted Carbobenzyloxyamino)Hexanoic Acid and N$^\epsilon$-(Carbobenzyloxy)-L-Lysine Lower Alkyl Ester Monohydrochloride In the practice of this invention, the carbodimide coupling is conveniently carried out by admixing the 6-(substituted carbobenzyloxyamino)hexanoic acid (II), N$^\epsilon$-(carbobenzyloxy)-L-lysine lower alkyl ester monohydrochloride (III), and triethylamine in a suitable inert organic solvent such as methylene chlorode, acetonitrile or tetrahydrofuran. The resulting reaction medium is cooled to about 0°±5°C. and dicyclohexylcarbodiimide, which is first dissolved in a fresh aliquot of the reaction solvent, is added to the chilled reaction medium. The quantities of the reactants used are not critical and essentially equimolar proportions of the reactants are usually employed. An amount slightly in excess of a stoichiometric amount of the hexanoic acid comound is preferred, however, in order to suppress acyl urea formation. After addition of the dicyclohexylcarbodiimide, agitation at about 0°C. is continued for about 3 hours. Thereafter, the reaction medium is allowed to warm to room temperature and agitation continued until the reaction is substantially complete, usually in about 3 additional hours, although further agitation up to 18 hours is not detrimental. Dicyclohexyl urea and precipitated salts which are produced as by-products are removed from the reaction mixture by filtration. The lower alkyl ester intermediate (IV) is recovered from the filtrate by conventional techniques such as, for example, evaporation or distillation of the solvent. The crude intermediate can be further purified, if desired, by triturating with a suitable water-immiscible solvent such as, for example, ethyl acetate, followed by filtration to remove insoluble material, and washing and extraction of the filtrate by conventional solvent extraction techniques. The product can be recovered from the organic layer by conventional techniques such as evaporation or distillation as hereinbefore set forth. The lower alkyl ester residue can be further recrystallized, if desired, from hot ethyl acetate and cyclohexane.

The dipeptide acids (I) of this invention are readily obtained by saponification of the corresponding lower alkyl ester produced as described above. The saponification proceeds readily when the lower alkyl ester (IV) is dissolved in an inert organic solvent, preferably a mixture of acetone and dioxide, and a quantity of either sodium hydroxide or potassium hydroxide slightly in excess of a stoichiometric amount is admixed with the solution. After the saponification reaction has proceeded to substantial completion, usually in about one-half to two hours, the product can be separated by dilution of the reaction mixture with water, followed by extraction with a non-polar water-immiscible organic solvent such as ethyl acetate to remove any unchanged starting material, acidification of the aqueous mixture, preferably to pH 3–4, and finally, by extraction with a non-polar water-immiscible organic solvent. If desired, the initial organic extract can be back extrated with a polar solvent such as a dilute aqueous salt solution and the polar solvent extract thus obtained combined with the initial aqueous medium prior to the acidification step. The dipeptide acid product (I) is recovered by removing the organic solvent by conventional procedures such as evaporation or distillation. The product can be purified, if desired, by conventional techniques such as recrystallization and washing from hot acetate and cyclohexane.

B. Examples

The following examples further illustrate the present invention and the manner in which it can be practiced; they should be construed merely as representative examples and not as limitations on the overall scope of the invention

EXAMPLE 1:

$N^\alpha$-[6-(3-Chlorocarbobenzyloxyamino)hexanoyl]-$N^\epsilon$-(carbobenzyloxy)-L-lysine

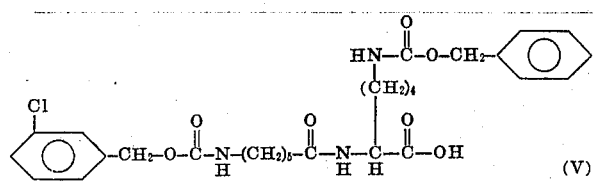

To an agitated suspension of 3.98 grams (0.013 mole) of 6-(3-chlorocarbobenzyloxyamino)hexanoic acid and 3.31 grams (0.01 mole) of $N^\epsilon$-(carbobenzyloxy)-L-lysine methyl est r monohydrochloride in 40 milliliters of methylene chloride was added 1.34 milliliters (0.01 mole) of triethylamine. The resulting reaction medium was cooled to about 0°C. whereupon 2.06 grams (0.01 mole) of dicyclohexylcarbodiimide dissolved in about 10 milliliters of methylene chloride was added. Agitation of the reaction medium was continued at 0°±3°C. for about 3 hours and thereafter at room temperature for about 15 additional hours. The reaction mixture was filtered to remove dicyclohexyl urea and precipitated salts, the filter cake rinsed with about 30 milliters of methylene chloride and the combined filtrate and rinse freed of solvent in vacuo. The resulting residue was triturated with about 125 milliliters of ethyl acetate and filtered. The filtrate was washed successively with a dilute salt water solution, twice with cold 10 percent citric acid, twice with a saturated bircarbonate solution, once with a dilute salt solution and once with a saturated salt solution. The organic layer was dried over $MgSO_4$ and the solvent removed in vacuo. The residue was recrystallized by dissolving it in hot ethyl acetate, filtering the hot solution fluted paper, diluting the hot filtrate with hot cyclohexane to permanent turbidity and cooling. White crystals of the $N^\alpha$-[6-(3-chlorocarbobenzyloxyamino)-hexanoyl]-$N^\epsilon$-(carbobenzyloxy)-L-lysine methyl ester intermediate were recovered in a yield of 89 percent, based on the quantity of lysine methyl ester monohydrochloride used as a starting material.

A suspension of 4.0 grams of the methyl ester thus prepared in 20 milliliters of acetone and 40 milliliters of dioxane was heated and agitated until solution was complete, whereupon the solution was cooled rapidly to room temperature and 7.0 milliliters 1.0 N. aqueous sodium hydroxide added immediately to the agitated solution. After agitation had continued for about 2 hours, the reaction medium was diluted with about 100 milliliters of water and extracted first with about 100 milliliters and a second time with about 50 milliliters of ethyl acetate. The ethyl acetate extracts were combined and back-extracted with about 50 milliliters of dilute aqueous salt solution. The dilute salt layer and the initial aqueous layer were combined, acidified to a pH of about 3–4 by addition of hydrochloric acid, and twice extracted with 60 milliliters of ethyl acetate. The $N^\alpha$-[6-(3-chlorocarbobenzyloxyamino)-hexanoyl]-$N^\epsilon$-(carbobenzyloxy)-L-lysine product (V) was recovered as a residue by evaporation of the ethyl acetate in vacuo and purified by recrystallization from hot ethyl acetate and cyclohexane in the same manner as hereinbefore set forth for purification of the methyl ester intermediate. A 67 percent yield was realized, methyl ester basis. Elemental anaylsis showed 59.94 precent carbon, 6.63 percent hydrogen, 7.54 percent nitrogen and 6.61 percent chlorine as compared with theoretical values of 59.83, 6.46, 7.48 and 6.31 percent respectively. Melting point for the purified product was 85°–87°C.

Following the same general procedure of Example 1, each of the $N^\alpha$-[6-(substituted carbobenzyloxyamino)-hexanoyl]-$N^\epsilon$-(carbobenzyloxy)-L-lysines listed in Table 1 was prepared.

TABLE 1

| Substituent | Mol. Formula | Mol. Wt. | Melting Point, °C. | % Yield Methyl Ester Basis |
| --- | --- | --- | --- | --- |
| "R" when n=1: | | | | |
| 4-fluoro | $C_{28}H_{36}FN_3O_7$ | 545.61 | 110–112 | 90 |
| 4-chloro | $C_{28}H_{36}ClN_3O_7$ | 562.07 | 109–111 | 90 |
| 3-bromo | $C_{28}H_{36}BrN_3O_7$ | 606.52 | 90–92 | 86 |
| 4-bromo | $C_{28}H_{36}BrN_3O_7$ | 606.52 | 105–107 | 92 |
| 3-methoxy | $C_{29}H_{39}N_3O_8$ | 557.65 | 76–78 | 80 |
| "X" when n=0 | | | | |
| 2-chloro | $C_{28}H_{36}ClN_3O_7$ | 562.07 | 75–77 | 77 |

Similarly, the 3-fluoro compound is prepared following the procedure of Example 1.

EXAMPLE 2 N $N^\alpha$[6-(4-Methoxycarbobenzyloxyamino)hexanoyl]-$N^\epsilon$-(carbobenzyloxy)-L-lysine.

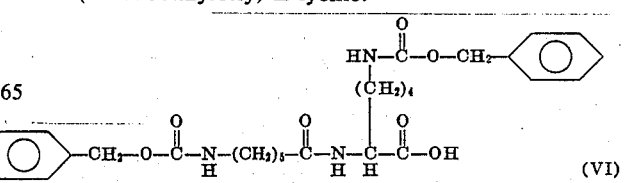

Essentially the same procedure was followed as in Example 1 with two exceptions. In the recovery and purification of the 4-methoxy substituted methyl ester intermediate, the citric acid extraction of Example 1 was omitted. Instead, the ethyl acetate filtrate was admixed with 10 grams of Dowex 50–X8 strong acid cation exchange resin in the hydrogen ion form. After one hour of agitation, the mixture was filtered, washed and the methyl ester recovered from the ethyl acetate layer as hereinbefore set forth in Example 1. The second modification occurred in the acidification of the aqueous alkaline layer in the saponification process. Instead of acidification by addition of hydrochloric acid as in Example 1, the aqueous layer was acidified by stirring with a five-fold equivalent excess of Dowex 50–X8[H$^+$] resin for about 90 minutes. Subsequent recovery and purification of the N$^\alpha$-[6 - (4 - methoxycarbobenzyloxyamino)hexanoyl]-N$^\epsilon$-(carbobenzyloxy-L-lysine product (VI) was effected as in Example 1. A yield of 83 percent was realized, methyl ester basis. The purified product melted at 102°–103°C. Elemental analysis revealed 62.19 percent carbon, 7.20 percent hydrogen and 7.78 percent nitrogen as compared with theoretical values of 62.46, 7.05 and 7.54 respectively.

C. Utility

It has been discovered by in vitro testing that the N$^\alpha$-[6-(substituted carbobenzyloxyamino)hexanoyl]-N$^\epsilon$-(carbobenzyloxy-L-lysine compounds of the present invention are effective as bronchial dilators. The test procedures employed were based on the extent of relaxation produced by the test compound, when employed in a solution of oxygenated Tyrode's solution, on a spiral strip of guinea pig trachea suspended therein.

EXAMPLE 3

In one test procedure, the known bronchodilator aminophylline, which produces approximately 100 percent relaxation when employed at a concentration of 120 micrograms per milliliter of solution, was used as a reference compound. When employed at a concentration of 120 micrograms per milliliter, hereinafter $\gamma$/ml., the activity of the 3-bromo compound was found to be about 30 percent that of aminophylline, while the compounds with the following substituents were found to be at least 50 percent as active as aminophylline at the same concentration: 3-methoxy, 4-methoxy, 1-chloro, 4-chloro, 4-bromo and 4-fluoro.

In a second run, the 4-methoxy and 4-fluoro compounds were evaluated at a concentration of 60 $\gamma$/ml. and were found to be about 65 percent and about 50 percent as active respectively as was the reference compound aminophylline when employed at the same concentration.

EXAMPLE 4:

In another procedure, each of the compounds listed in Table 2 was tested to determine the concentration at which the compound when employed as hereinbefore set forth, elicits relaxation in at least 50 percent of the trachea specimens treated. The results are tabulated in Table 2. The ED$_{50}$ of aminophylline is 21.0 $\gamma$/ml ($\pm$ 0.5).

TABLE 2

| Substituent | ED$_{50}$ $\gamma$/ml. |
|---|---|
| "R" when $n=1$: | |
| 3-methoxy | 52.0 |
| 4-methoxy | 38 |
| 3-chloro | 29.5 |
| 4-chloro | 15.8 |
| 4-bromo | 7.5 |
| "X" when $n=0$: | |
| 2-chloro | 15.0 |

D. Preparation of the N$^\epsilon$-(Carbobenzyloxy)-L-Lysine Lower Alkyl Ester Monohydrochloride Starting Material The N$^\epsilon$-(Carbobenzyloxy)-L-lysine lower alkyl ester monohydrochloride used as a starting material was synthesized by the following series of reactions.

The procedure of Kjer and Larsen, *Acta Chem. Scand.*, 15, 750 (1961) was used to prepare the copper chelate of N$^\epsilon$-(carbobenzyloxy)-L-lysine by reacting L-lysine monohydrochloride with basic aqueous cupric carbonate and water followed by the reaction of the product with benzyl chloroformate in the presence of magnesium oxide. (The benzyl chloroformate was made from phosgene and benzyl alcohol, by essentially following the procedure described by Boissonnas and Preitner, *Helv. Chem. Acta*, 36, 875 (1953).) Following the method of Folsch and Serk-Hanssen, *Acta Chem. Scand.*, 13, 1243 (1959), the chelate was freed of copper by contacting it with thioacetamide in a hot solution of dilute acetic acid, thus effecting precipitation of the copper as copper sulfide. The N$^\epsilon$-(carbobenzyloxy)-L-lysine was recovered from the filtrate upon cooling and, using the general procedure described by Shiba and Kaneko, *Bull. Chem. Soc. Japan*, 79, 65 (1958), was admixed with the appropriate lower alkyl alcohol and thionyl chloride to obtain the hydrochloride (III) used as a starting material.

E. Preparation of the 6-(Substituted Carbobenzyloxyamino)-Hexanoic Acids Used as Starting Materials The 6-(substituted carbobenzyloxyamino)hexanoic acids used as starting materials generally were synthesized by reacting the appropriate substituted benzyl chloroformate and 6-aminocaproic acid together in toluene in the presence of sodium hydroxide and then treating the reaction mixture with hydrochloric acid to obtain the 6-(substituted carbobenzyloxyamino)hexanoic acid starting material in a procedure similar to that described by Zahn and Hilderbrand, *Chem. Ber.*, 90, 320 (1957).

For the preparation of acid-sensitive 6-(4-methoxycarbobenzyloxyamino)hexanoic acid, however, a procedure essentially as described by Weygand and Kunger, *Chem. Ber.* 95, 1 (1962), was followed rather than the general procedure described above. 4-Methoxybenzyloxycarbonyl azide, prepared as in the reference cited, was dissolved in dioxane and the resulting solution was added with agitation to a mixture of 6-aminocaproic acid, magnesium oxide, and water and admixed for about 60 hours at room temperature. After filtering the reaction medium to remove any solid material, the filtrate was acidified by stirring with Dowex 50X8 strong acid cation exchange resin in the hydrogen ion form and the 6-(4-methoxycarbobenzyloxyamino)hexanoic acid product was extracted from the filtrate with ethyl acetate and recovered therefrom by evaporation.

What is claimed is:

1. A compound corresponding to the formula

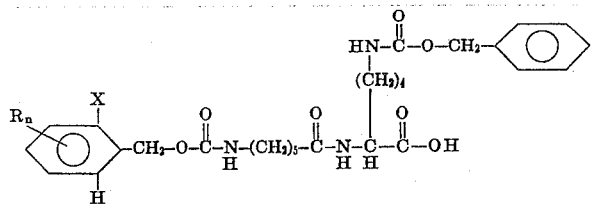

wherein X represents hydrogen or chloro, R represents halo or methoxy, and n represents an integer of 0 or 1, with the proviso that when n represents zero, X represents chloro and that when n represents, 1 X represents hydrogen.

2. The compound of Claim 1 which is $N^\alpha$-[6-(3-chlorocarbobenzyloxyamino)hexanoyl]-$N^\epsilon$-(carbobenzyloxy)-L-lysine.

3. The compound of Claim 1 which is $N^\alpha$-[6-(2-chlorocarbobenzyloxyamino)hexanoyl]-$N^\epsilon$-(carbobenzyloxy)-L-lysine.

4. The compound of Claim 1 which is $N^\alpha$-[6-(4-chlorocarbobenzyloxyamino)hexanoyl]-$N^\epsilon$-(carbobenzyloxy)-L-lysine.

5. The compound of Claim 1 which is $N^\alpha$-[6-(4-fluorocarbobenzyloxyamino)hexanoyl]-$N^\epsilon$-(carbobenzyloxy)-L-lysine.

5. The compound of Claim 1 which is $N^\alpha$-[6-(3-bromocarbobenzyloxyamino)hexanoyl]-$N^\epsilon$-(carbobenzyloxy)-L-lysine.

7. The

7. The compound of Claim 1 which is $N^\alpha$-[6-(4-bromocarbobenzyloxyamino)hexanoyl]-$N^\epsilon$-(carbobenzyloxy)-L-lysine.

8. The compound of Claim 1 which is $N^\alpha$-[6-(3-methoxycarbobenzyloxyamino)hexanoyl]-$N^\epsilon$-(carbobenzyloxy)-L-lysine.

9. The compound of Claim 1 which is $N^\alpha$-[6-(4-methoxycarbobenzyloxyamino)hexanoyl]-$N^\epsilon$-(carbobenzyloxy)-L-lysine.

* * * * *

UNITED STATES PATENT OFFICE
CERTIFICATE OF CORRECTION

Patent No. 3,821,189  Dated June 25, 1974

Inventor(s) Linneaus C. Dorman

It is certified that error appears in the above-identified patent and that said Letters Patent are hereby corrected as shown below:

The correct issue date is June 25, 1974, not June 28, 1974 as appears on the patent;

Column 2, line 23, correct spelling of "carbodiimide";

Column 2, line 28, correct spelling of "chloride";

Column 2, line 37, correct spelling of "compound";

Column 2, line 66, change "dioxide" to -- dioxane --;

Column 3, line 11, correct spelling of "extracted";

Column 3, line 29, correct spelling of "hexanoyl" in compound name;

Column 3, line 45, correct spelling of "ester";

Column 3, line 62, correct spelling of "bicarbonate";

Column 4, line 3, insert the word "through" between "solution" and "fluted";

Column 4, line 15, delete the number "50" and insert in its place -- of --;

Column 4, line 34, correct spelling of "analysis";

Column 4, line 59, delete "N" in Example 2N;

Column 5, line 19, insert a closing parenthesis ")" after carbobenzyloxy;

Column 5, line 29, insert a closing parenthesis ")" after carbobenzyloxy;

(continued on next sheet)

PO-1050
(5/69)

UNITED STATES PATENT OFFICE
CERTIFICATE OF CORRECTION

Patent No. 3,821,189 (cont.)    Dated June 25, 1974

Inventor(s) Linneaus C. Dorman    PAGE - 2

It is certified that error appears in the above-identified patent and that said Letters Patent are hereby corrected as shown below:

Column 5, lines 51 and 52, the substituents should read as follows: 3-methoxy, 4-methoxy, 2-chloro, 3-chloro, 4-chloro, 4-bromo and 4-fluoro.;

Column 7, line 20, delete the comma after "represents" and insert a comma after "1";

Column 8, line 9, insert -- L-lysine -- after "zyloxy)-";

Column 8, line 10, delete the whole line;

Column 8, line 11, change "5" to -- 6 --;

Column 8, line 14, delete the whole line;

Signed and sealed this 24th day of December 1974.

(SEAL)
Attest:

McCOY M. GIBSON JR.           C. MARSHALL DANN
Attesting Officer              Commissioner of Patents